United States Patent
Jacob Sushil et al.

(10) Patent No.: US 8,527,366 B2
(45) Date of Patent: Sep. 3, 2013

(54) CONFIGURING A PRODUCT OR SERVICE VIA SOCIAL INTERACTIONS

(75) Inventors: George T. Jacob Sushil, Bangalore (IN); Kalapriya Kannan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 13/022,677

(22) Filed: Feb. 8, 2011

(65) Prior Publication Data
US 2012/0203657 A1      Aug. 9, 2012

(51) Int. Cl.
G06Q 30/00     (2012.01)
G06Q 90/00     (2006.01)

(52) U.S. Cl.
USPC ........................................................ 705/26.5

(58) Field of Classification Search
USPC ............................... 705/26.1, 26.2, 26.5, 26.7
See application file for complete search history.

(56) References Cited

U.S. PATENT DOCUMENTS

| | | | |
|---|---|---|---|
| 7,080,071 B2 | 7/2006 | Henrion et al. | |
| 7,426,481 B1 | 9/2008 | Connors et al. | |
| 7,756,756 B1 * | 7/2010 | Lifson | 705/26.1 |
| 7,788,591 B2 | 8/2010 | Brunner et al. | |
| 7,805,461 B2 | 9/2010 | Gadamsetty et al. | |
| 2005/0131770 A1 | 6/2005 | Agrawal | |
| 2006/0167988 A1 * | 7/2006 | Barck et al. | 709/203 |
| 2006/0206510 A1 * | 9/2006 | Moulhaud et al. | 707/101 |
| 2007/0112637 A1 | 5/2007 | So | |
| 2008/0004973 A1 | 1/2008 | Rothschild | |
| 2008/0162271 A1 * | 7/2008 | Benjamin | 705/10 |
| 2008/0276184 A1 * | 11/2008 | Buffet et al. | 715/752 |
| 2009/0043668 A1 * | 2/2009 | Kaye | 705/26 |
| 2010/0095297 A1 * | 4/2010 | Sethi et al. | 718/1 |
| 2010/0138231 A1 * | 6/2010 | Linthicum et al. | 705/2 |
| 2010/0153212 A1 | 6/2010 | Stoll | |
| 2010/0281429 A1 * | 11/2010 | Kheiri et al. | 715/822 |
| 2010/0324704 A1 * | 12/2010 | Murphy et al. | 700/94 |
| 2010/0325016 A1 * | 12/2010 | Marcus et al. | 705/27 |
| 2011/0004524 A1 * | 1/2011 | Paul et al. | 705/14.58 |
| 2011/0004575 A1 * | 1/2011 | Yang et al. | 706/12 |
| 2011/0018899 A1 * | 1/2011 | Benson et al. | 345/619 |
| 2011/0030028 A1 * | 2/2011 | Menten et al. | 726/1 |
| 2011/0066614 A1 * | 3/2011 | Chowdhury et al. | 707/736 |
| 2011/0320373 A1 * | 12/2011 | Lee et al. | 705/319 |

OTHER PUBLICATIONS

Brabham, D.C., "Moving the Crowd at Threadless: Motivations for Participation in a Crowdsourcing Application" [Abstract], Information Communication and Society, vol. 13, No. 8, pp. 1122-1145, 2010.*

Micrisift Press Computer Dictionary, Third Edition, Microsoft Press Redmond, 1997, pp. 27 and 298.*

(Continued)

*Primary Examiner* — Nicholas D Rosen
(74) *Attorney, Agent, or Firm* — Patterson & Sheridan, LLP

(57) ABSTRACT

Techniques are disclosed for configuring a product or service based on social interactions. In one embodiment, one or more users are selected to participate in configuring a desired product or service. The desired product or service may be associated with one or more configurable parameters. One or more configurations for the desired product or service may be determined, based on input received from the one or more users.

19 Claims, 4 Drawing Sheets

(56) References Cited

OTHER PUBLICATIONS

Osofsky, Marc, Social shopping and Product Configuration to create the Long Tail, Optaros, Jul. 14, 2008, <http://www.optaros.com/blogs/social-shopping-and-product-configuration-create-long-tail>.

Jacob, George T. et al., A system and method for defining Dynamic Product configurators through social engagements and activities, Aug. 2009, International Business Machines Incorporation, Armonk, New York, United States.

Leckner, Thomas, Customer Communities to support Product Configuration, Fourth International ICSC Symposium on Engineering of Intelligent Systems (EIS 2004), Feb. 29, 2004, International Computing Sciences Conferences, Millet, Alberta, Canada.

Ardissono, L. et al., Personalised Configuration of Products and Services in Co-operating Markets, Knowledge-Based Intelligent Information Engineering Systems & Allied Technologies, 2002, pp. 502-506, IOS Press, Amsterdam, The Netherlands.

\* cited by examiner

CONFIGURING A PRODUCT OR SERVICE VIA SOCIAL INTERACTIONS

BACKGROUND

Electronic commerce, commonly known as e-commerce or eCommerce, refers to the buying and selling of products or services over electronic systems such as the Internet and other computer networks. One form of electronic commerce is online shopping, whereby a user accesses a virtual store whereat the user may browse through electronic catalogs, scan pages bearing product illustrations and accompanying descriptions, and select articles to purchase. Subsequently, when the user clicks on a "buy" or another button reflecting an intention to purchase the selected articles, then the user is prompted to input personal information to complete the order, where the personal information may include a name, a delivery address, a desired payment method, etc.

SUMMARY

Embodiments of the invention provide a computer-implemented method, computer program product and system for performing an operation that includes receiving a selection, by a primary user, of an item that the primary user desires to be configured prior to at least one of: (i) the primary user specifying to purchase the configured item and (ii) the primary user specifying the configured item as being available for at least one other user to purchase. The operation also includes receiving an indication of one or more configurable parameters of the selected item. The operation also includes receiving a selection, by the primary user, of at least one secondary user from a personal network of the primary user, to participate in configuring the selected item. The operation also includes requesting the at least one secondary user to provide input pertaining to the one or more configurable parameters of the selected item. The operation also includes determining one or more configurations for the selected item, based on the input provided by the at least one secondary user responsive to the request.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
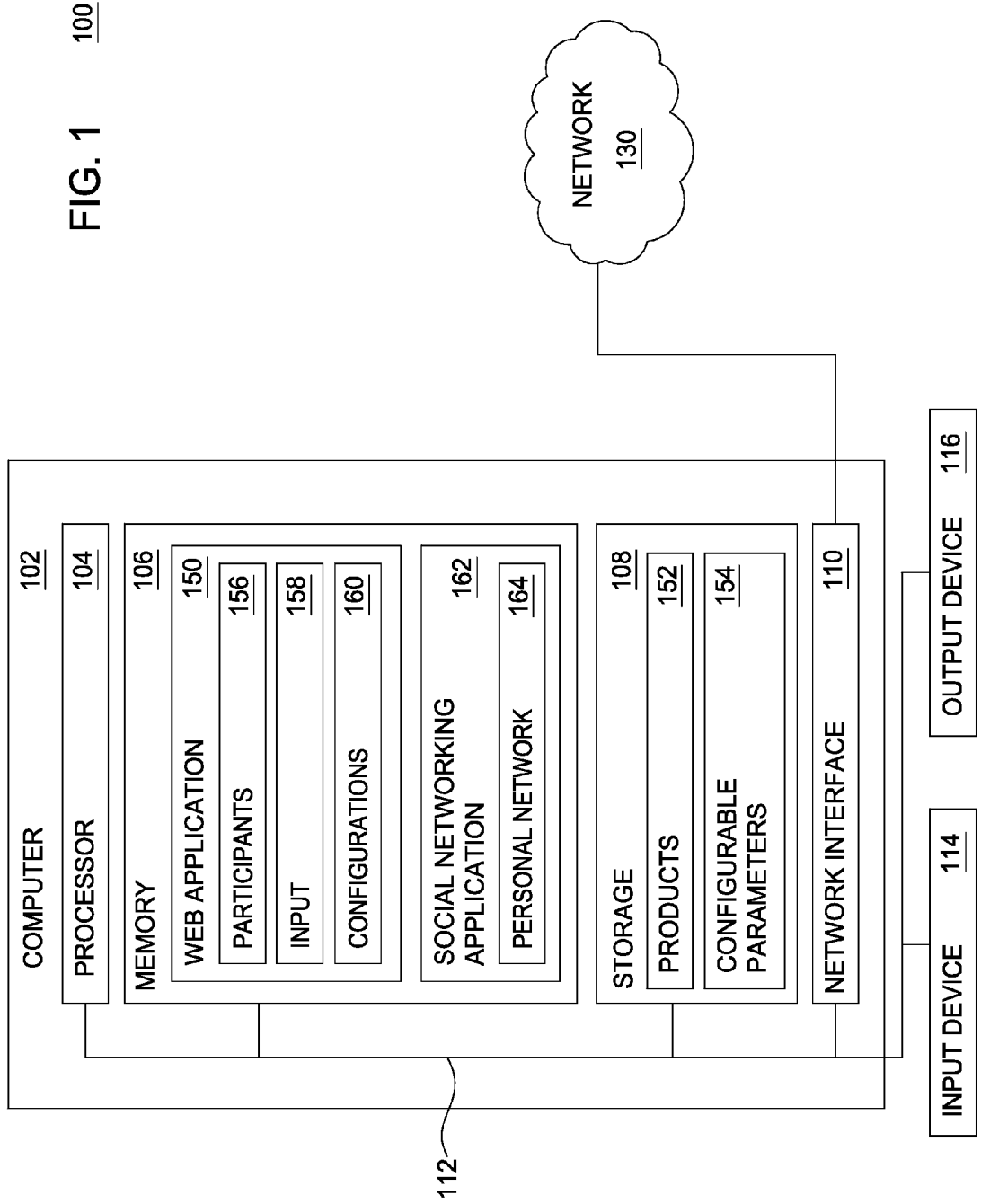
FIG. 1 is a block diagram illustrating a system for configuring a product or service via social interactions, according to one embodiment of the invention.

Embodiments of the invention provide techniques for configuring an item via social interactions, where an item may be a product or a service. One embodiment of the invention includes a virtual store that may be accessed by a user via a Uniform Resource Identifier (URI) associated with the virtual store. For example, the user may input the URI into a client application such as a web browser. One embodiment of the invention may also include a web application configured to serve web pages of the virtual store to the web browser, responsive to requests from the web browser. The web pages may be rendered by the web browser to produce one or more graphical user interface (GUI) screens of the virtual store, for display to the user. In one embodiment, the user of the virtual store selects a product or service that the user desires to configure. The product or service may include one or more configurable parameters. For example, if the product is a new car of a specified make and model, the configurable parameters may include exterior color, interior color, interior type, body style, engine, alloy wheels, sunroof, stereo upgrades, entertainment options, safety features, a built-in navigational device, etc. Further, depending on the embodiment, the user may either desire to purchase or to sell the product or service. For example, the user may either be a prospective customer who desires to purchase the new car or a business owner who desires to introduce the new car into the marketplace. Of course, although embodiments are described herein with reference to the use case of configuring a new car, the use case is merely exemplary and is not intended to be limiting of the invention. The techniques disclosed herein may be used to configure any product or service, such as a house, a computer, a premium television package, an Internet service plan, a cellular phone plan, a travel itinerary, a tour package, a movie showing, apparel, etc.

In some cases, the user may desire other users to participate in configuring one or more parameters of the product or service selected by the user. The other users may include anyone associated with the user, such as family members, friends, coworkers, experts, etc. For instance—continuing the previous example of configuring the new car of the specified make and model—the user may desire the exterior color and interior color to be configured by a spouse of the user, because it may be important to the user that the car is aesthetically appealing to the spouse. The user may also desire the engine to be configured by a friend of the user, because the friend is much more knowledgeable about engines than the user is. Of course, the user may also configure one or more other parameters of the car, such as the body style and entertainment options. Accordingly, in one embodiment, the user of the virtual store selects the spouse and the friend to participate in configuring the new car. The user may also specify one or more parameters each participant is allowed to configure. The spouse and the friend may be identified in various ways, such as via respective email addresses or weblog URIs provided by the user.

In another embodiment, if the spouse and the friend are included in a personal network of the user on a social networking application, the virtual store accesses the social networking application (e.g., using security credentials provided by the user) and displays a list of all members of the personal network, from which the user may conveniently select the spouse and the friend from the list. In one embodiment, the social network application refers to any application with which a user may perform online social networking over a computer network such as the Internet. The personal network may include a representation of each user (e.g., in the form of a profile for the respective user), a representation of social relations of each user, and a variety of additional services. The additional services may allow each user to share ideas, interests, activities, and events within the social network of the respective user. The social networking application can be a web-based application that allows users to create and publish shared content on personal web pages. Shared content may include digital media that is accessible by visitors to the personal web page. The digital media may include text, hyperlinks, images, video, audio, etc. The user who owns the shared content may also determine which other users may access the shared content.

In one embodiment, after the user selects the desired participants for configuring the product or service, the virtual store requests the selected participants to provide input pertaining to the parameters of the product or service. Depending on the embodiment, the input may be provided via email, via the virtual store, via the social networking application, etc. Once the input is received, the virtual store determines one or more configurations for the product or service, based on the input. The virtual store then outputs the one or more configurations to the user for selection and/or approval. Advantageously, using the virtual store, the user may more conveniently configure a product or service based on social interactions and/or the social network of the user at least in some cases. The product or service may be configured using input from desired participants from the social network of the user. Consequently, the product or service may be configured more conveniently at least in some cases. For example, the product or service may be configured more conveniently than having to manually contact, solicit, record, and/or submit input from each desired participant. Further, configuring the product or service on behalf of the user via the virtual store may be convenient and/or rewarding to a selected participant at least in some cases. Accordingly, customer satisfaction of the virtual store may be improved, and sales at the virtual store may be increased.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access a virtual store that is provided by a web application executing in the cloud. For example, the cloud may provide virtualized computing resources for executing the web application. Having the web application execute in the cloud allows the user to manage execution of the web application from any computing system attached to a network connected to the cloud (e.g., the Internet).

Depending on the embodiment, the web application may execute in an application server configured to provide services to web applications for security, state maintenance, data access and persistence, via one or more application programming interfaces (APIs). In one embodiment, the application server conforms to the Java Platform, Enterprise Edition (Java EE). As is known, Java EE is a widely used platform for server programming in the Java™ programming language. The Java EE-compliant application server may include one or more containers, such as a Servlet container and an Enterprise JavaBeans (EJB) container, and may provide services such as Java Naming and Directory Interface (JNDI), Java Message Service (JMS), and connection pooling.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for configuring a product or service via social interactions, according to one embodiment of the invention. The networked system 100 includes a computer 102. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, solid state drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes a web application 150 and a social networking application 162. Although embodiments are described herein with reference to the social networking application 162 and the web application 150 executing on the computer 102, in other embodiments, the social networking application 162 may execute on a different computer that is connected to the computer 102 via the network 130. As described above, in one embodiment, the web application 150 generates web pages of a virtual store, responsive to requests from a user of the virtual store. For example, the requests may be sent to the web application 150 via web browser of the user. The web pages may be rendered by the web browser to produce GUI screens of the virtual store.

In one embodiment, from the virtual store, the user may select a product or service that the user desires to configure. Next, the user may select one or more other users to participate in configuring the selected product or service. For convenience, the user making the selection may also be referred to herein as a primary user, and the one or more other users being selected may also be referred to herein as secondary users. The one or more secondary users may be selected from a personal network retrieved from the social networking application 162, in which case each secondary user is identified by a unique identifier provided by the social networking application 162. Alternatively, the primary user may select the one or more secondary users by specifying a corresponding email address or URI of each secondary user, where the URI identifies a website of the respective secondary user. Still alternatively, the one or more secondary users may be selected from a contact list retrieved from personal information manager (PIM) used by the primary user. The PIM refers to an application that serves as a personal organizer that facilitates recording, tracking, and/or management of personal information such as address books, reminders, notes, and lists. Depending on the embodiment, some or all of the functionality of the PIM may be integrated into a different application such as a mail user agent (MUA). The MUA refers to an application configured to manage email for the user.

In one embodiment, aside from selecting one or more secondary users to participate in configuring the selected product or service, the primary user may also specify which parameter(s) may be modified by each secondary user. As described above with reference to the example of configuring a new car, the primary user may desire the interior color and exterior color of the new car to be configured by the spouse. The primary user may also desire the engine to be configured by the friend. Accordingly, in one embodiment, the web application 150 may receive input from the primary user, where the input specifies that the spouse is only allowed to configure the interior color and exterior color and that the friend is only allowed to configure the engine. In an alternative embodiment, the web application 150 allows all secondary users to configure all parameters of the selected product or service by default, and the input specifies, for each secondary user, what parameters the respective secondary user is not allowed to configure.

Depending on the embodiment, the primary user may also specify and/or modify the default behavior for the web application 150—e.g., whether to allow all secondary users to configure all parameters or to allow no user to configure any parameter. Further, in some embodiments, the primary user may also specify to allow multiple secondary users to configure the same parameter of the selected product or service. Accordingly, the primary user may solicit input from multiple friends on a given parameter and/or select a parameter value most frequently selected by the friends, etc. For example, the primary user may designate multiple family members as being allowed to configure the interior color and exterior color of the car. The primary user may then select an interior color and/or exterior color that received the most votes from the family members.

Further, in one embodiment, the primary user may select a role for each secondary user. Each role may be selected from a plurality of roles defined by the primary user or by an administrative user. Each role may include an associated weight that is specified by the primary user or by the administrative user. The weight associated with the role may reflect a level of deference accorded by the primary user to the role and any secondary user having the role. In one embodiment, when tallying votes from multiple family members for a given parameter, the web application 150 may also take into account the weight of the role of each respective family member. For example, suppose that plurality of roles include a first role of "regular participant" having a weight of "1.0" and a second role of "expert participant" having a weight of "2.0". In tallying votes for a given parameter, the web application 150 may count a vote from a regular participant as one vote for the parameter—and count a vote from an expert participant as two votes for the given parameter. In other words, in this particular example, the web application 150 may multiply each vote of a secondary user by the weight of the role of the respective secondary user. Advantageously, where the primary user may more conveniently solicit input from multiple secondary users for a given parameter, while differentiating the secondary users into multiple roles.

In one embodiment, each secondary user is prompted to configure one or more parameters of the product or service, as specified by the primary user. Configuring a parameter includes specifying one or more values for the parameter. Depending on the embodiment, each secondary user may be prompted by the web application 150, the social networking application 162, or a module of the web application 150. The module may execute in a runtime environment provided by the social networking application 162 and/or using APIs exposed by the social networking application 162. Depending on the embodiment, the module may be a widget or plugin for the social networking application 162, or the module may itself be a standalone application.

In one embodiment, each secondary user may configure one or more parameters of the product or service via a respective user account associated with the web application 150. Secondary users who have not registered for a user account associated with the web application 150 may be required to do so to configure the one or more parameters. Additionally or alternatively, each secondary user may configure the one or more parameters via the social networking application 162 or via a module of the web application 150 that is accessible from the social networking application 162, in which case the secondary users are not necessarily required to have registered for a user account associated with the web application 150. In some embodiments, in order to configure the one or more parameters, each secondary user is prompted to input login information associated with the web application 150 or with social networking application 162, where the login information includes at least one of a user login and a user password.

In one embodiment, the primary user may also configure a mechanism by which each secondary user configures one or more parameters of the product or service. The mechanism may specify a type of input control such as radio boxes, input fields, text areas, dropdown menus, checkboxes, etc. In one embodiment, the web application 150 may present the primary user with multiple types of input controls, from which the primary user may select desired types of input controls to be used by a specified secondary user in configuring a specified parameter of the product or service. Continuing the previous example of configuring a new car, the primary user may specify for the spouse to configure the exterior color of the new car by selecting a color from a palette of predefined colors. The primary user may also specify for the spouse to configure the interior color of the new car by typing in a name of a desired color into a text input field.

In one embodiment, after each parameter is configured with one or more values by a secondary user, the web application 150 determines one or more configurations for the product or service. The web application 150 may generate a set of configurations that conform to the input provided by the secondary users. Depending on the embodiment, each configuration may exclude parameters reserved for configuration by the primary user—i.e., parameters that the primary user did not previously indicate for any secondary user to configure. The web application 150 may then evaluate the set of configurations against one or more rules specifying combinations of parameter values that are valid or invalid. For example, some combinations of exterior color and interior color may not be available from the manufacturer of the new car. Accordingly, the web application 150 may identify and remove any invalid configurations from the set. The web application 150 may then store the configurations remaining in the set and/or output the configurations for display to the primary user and/or one or more secondary users.

In one embodiment, once the set of configurations is generated, the primary user may perform additional operations on the set of configurations. The additional operations may include reviewing the configurations, selecting a desired configuration for placing a purchase order for the product or service and/or placing the purchase order, modifying the configurations, augmenting the configurations with additional parameters, requesting the secondary users to further configure one or more parameters, requesting users other than the secondary users to configure one or more parameters, etc. Further, all operations performed by the web application 150 in regards to configuring and/or placing a single order for a desired product and/or service may be regarded as a single session and/or transaction of the primary user at the virtual store. In other words, one or more of the operations of the web application 150 may be regarded as occurring within the context of the session and/or transaction of the primary user at the virtual store. The operations may include receiving, from a web browser of the primary user, a series of requests for web pages of the virtual store and sending, to the web browser, a series of responses in the form of the web pages of the virtual store. The operations may further include prompting each secondary user to configure a parameter of the desired product and/or service and receiving input from the respective secondary user for configuring the parameter of the desired product and/or service. The operations may further include determining one or more configurations based on the received input, receiving a selection by the primary user of a desired configuration, and placing the order for the product or service having the desired configuration. Advantageously, at least in some cases, the primary user may more conveniently have a product or service configured at least in part based on input from specified secondary users.

As used herein, configuring a product or service by selected secondary users does not include creating and/or editing documents by multiple users via any collaborative application. As used herein, a collaborative application refers to any application that allows multiple users to collaboratively create and/or edit documents and that does not perform one or more of the operations of the web application 150 as disclosed herein. Examples of the operations of the web application 150 include permitting a primary user to specify which other users may modify which parameters of a selected product or service and determining one or more configurations for the selected product or service using input received from the one or more secondary users in regards to the parameters. Examples of collaborative applications include content management systems (CMS), document management systems (DMS), groupware, revision control systems, and wikis. The documents include word processing documents, spreadsheets, source code files, media files such as image files, audio files, and video files, etc. A CMS refers to an application configured to allow multiple users to contribute to and share stored data. A DMS refers to an application configured to track and store electronic documents and/or images of paper documents. Groupware refers an application configured to facilitate collaborative activity between multiple users and the coordination thereof. A revision control system refers to an application configured to manage changes to documents, programs, and other information stored as computer files. A wiki refers to a website that allows the creation and editing of any number of interlinked web pages via a web browser using a predefined markup language or a what-you-see-is-what-you-get (WYSIWYG) text editor.

Figure 2:
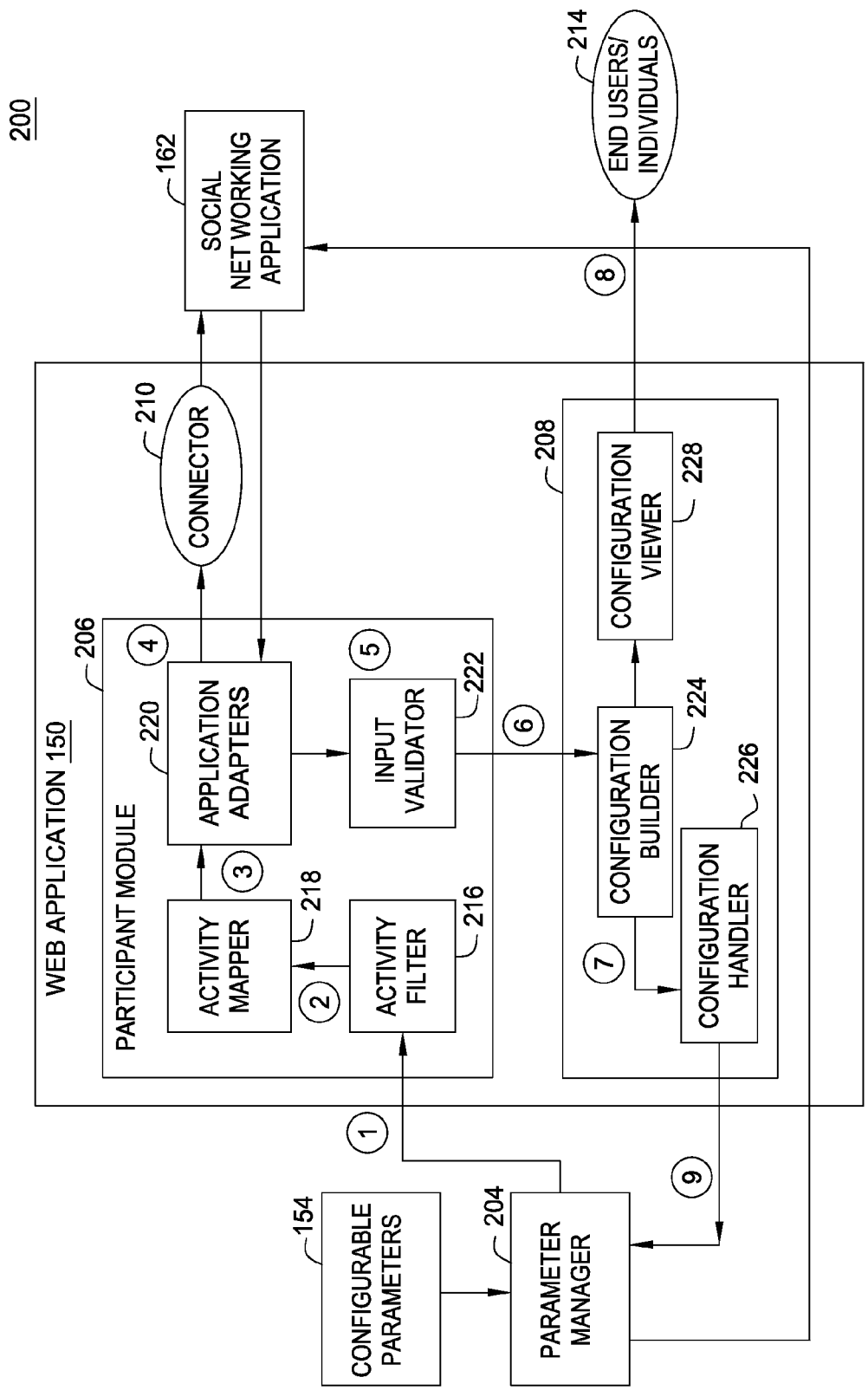
FIG. 2 is a block diagram illustrating components of a web application for configuring a product or service, according to one embodiment of the invention.

FIG. 2 is a block diagram 200 illustrating components of the web application 150 of FIG. 1, according to one embodiment of the invention. As shown, the components of the web application 150 include a participant module 206 and a generator module 208. In one embodiment, the participant module 206 is configured to allow the primary user to manage which secondary users may participate in configuring a product or service and what parameters of the product or service each secondary user may specify or modify. The participant module 206 may also be configured to collect input from the secondary users, in regards to the parameters of the product or service. The generator module 208 is configured to provide one or more configurations of the product or service, based on the input collected by the participant module 206. The generator module 208 may also be configured to output the one or more configurations to the primary user and/or the secondary users.

As shown, the participant module 206 includes an activity filter 216, an activity mapper 218, application adapters 220, and an input validator 222. In one embodiment, the activity filter 216 receives data specifying a set of configurable parameters 154. The activity filter 216 may also specify, based on input from the primary user and/or an administrative user, which activities, input controls, and/or parameter values are acceptable for configuring each parameter 154. The activities include specifying a parameter via the web application 150 or the social networking application 162, posting a comment on a website such as a weblog or an online forum, sending an email, etc. The input controls include radio boxes, input fields, text areas, dropdown menus, checkboxes, etc. Depending on the embodiment, some or all of the functionality of the activity filter 216 may be performed by a parameter manager 204, which is configured to designate a configuration to be applied, based on input from the primary user. The activity mapper 218 is configured to associate parameters and/or activities with a specified social networking application. The parameter manager 204 may also be configured to provide one or more configurable parameters to the specified social networking application.

In one embodiment, each application adapter 220 is specific to a social networking application and provides connectivity to the social networking application based on protocols and/or APIs supported by the social networking application. Depending on the embodiment, some or all of the functionality of providing connectivity to the social networking application may be performed by a connector module 210. Each application adapter 220 may also receive input from secondary users via the social networking application 162. The input validator 222 determines whether the input received from the secondary users is valid for a specified parameter. In making the determination, the input validator 222 may evaluate one or more rules specifying what values are valid for a given parameter, where each rule is defined by an administrative user. Additionally or alternatively, the input validator 222 may also determine whether combinations of parameters received from one or more secondary users is valid, based on the one or more rules. For instance, continuing the previous example of configuring a new car, some combinations of exterior color and interior color may not necessarily be available from the manufacturer of the new car.

As shown, the generator module 208 includes a configuration builder 224, a configuration handler 226, and a configuration viewer 228. In one embodiment, the configuration builder 224 generates a data structure representing a set of configurations that conform to the input received from the secondary users. In some embodiments, the data structure may be a tree and may include all configurations that conform to the received input. The data structure may be generated based on the received input and the configurable parameters 154. The configuration handler 226 is configured to traverse the data structure using one or more predefined techniques such as depth-first search and breadth-first search, and/or provide one or more configurations in the generated data structure to the parameter manager 204.

As described above, the parameter manager 204 may designate a configuration to be applied, based on input from the primary user. For example, the primary user may select a configuration from the set configurations and place an order for purchasing a product or service having the selected configuration. In one embodiment, the parameter manager 204 may also store information indicating which configurations more frequently result from configuration by secondary users. The information may subsequently be provided to the participant module 206 to indicate to the primary user and/or the secondary users which parameters or combinations thereof are frequently selected by other users. The configuration viewer 228 generates one or more views of the set of configurations for output to the end users 214, which may include the primary user, the secondary users, and/or other users of the web application 150. The views may textually represent the configurations and/or graphically depict a product having the configurations (thereby providing a preview of the product). Accordingly, the primary user may browse the set of configurations and/or select a configuration to be applied to the product or service.

As described above, in one embodiment, a primary user and/or one or more secondary users may configure a product or service using the web application 150. To this end, the web application 150 may perform a sequence of operations, which are described as follows. The parameter manager 204 may retrieve the configurable parameters 154 for the product or service and provide the configurable parameters 154 to the activity filter 216 of the web application 150. Next, the activity filter 216 may associate activities, input controls, and/or parameter values to each configurable parameter 154. The activity mapper 218 may then associate the configurable parameters 154 with a specified social networking application. Next, the application adapter 220 connects to the specified social networking application. The application adapter 220 may also prompt each secondary user for input for each configurable parameter 154. The application adapter 220 may also receive input from the secondary users and provide the input to the input validator 222. The input validator 222 may then determine whether the values for the configurable parameters 154 are valid. The input validator 222 may also determine whether combinations of the values are valid.

Next, the configuration builder 224 generates the data structure representing a set of configurations that conform to the validated input. The configuration viewer 228 may then generate one or more views representing for each configuration in the set and/or for a respective product or service having the respective configuration in the set, for output to the primary user or the secondary users. Additionally or alternatively, the configuration handler 226 may provide the set of configurations to the parameter manager 204, such that a desired configuration of the set of configurations can be designated by the primary user.

As described above, although embodiments are described herein with reference to the use case of configuring a new car, those skilled in the art will recognize that any product or service may be configured using the techniques disclosed herein. For example, in one embodiment, a primary user may desire to organize an event to attend a movie showing at a theater with friends, which the primary user may designate as secondary users for configuring parameters of the movie showing. The parameters of the movie showing may include a movie title, a theater location, a showing date, a showing time, etc. In this embodiment, the web application 150 may additionally receive calendar information of the primary user and/or of the secondary users. The calendar information may be received from any calendaring application or any other application that includes a calendaring module. Further, in this embodiment, the one or more rules may specify which combinations of movie title, showing time, and showing date are valid for a given theater location. The input validator 222 may evaluate each parameter value and/or configuration based on the one or more rules. Based on the evaluation, the input validator 222 may mark a parameter value and/or configuration as invalid.

As another example, in one embodiment, the primary user may desire to purchase a new computer, which may be a laptop or desktop computer. Further, the primary user may desire to seek assistance of one or more secondary users in configuring the parameters of the new computer. The parameters of the new computer may include processor manufacturer, processor model, processor speed, memory manufacturer, memory capacity, hard disk manufacturer, hard disk type, hard disk storage capacity, hard disk speed in revolutions per minute (rpm), graphics card manufacturer, graphics card model, graphics memory capacity, motherboard manufacturer, motherboard model, support for RAID (Redundant Array of Independent Disks), support for gigabit Ethernet, etc. Assume that a first friend of the user is knowledgeable about hard disks and that a second friend of the user is knowledgeable about graphics cards. The primary user may designate the first friend to configure parameters such as hard disk manufacturer, hard disk type, and hard disk storage capacity. The primary user may also designate the second friend to configure parameters such as graphics card manufacturer, graphics card model, and graphics memory capacity. The primary user may configure other parameters himself/herself.

As a further example, in one embodiment, the primary user may be a business owner, product designer, product manufacturer, or service provider who desires to introduce a new product or a new variation of an existing product into the marketplace. Accordingly, the primary user may want to discover what kind of new product or new variation may be desirable to existing customers and/or prospective customers. In one embodiment, the primary user designates a group of existing customers and/or survey participants as secondary users. The secondary users are allowed to configure the parameters of the new product or new variation. In this particular example, the web application 150 determines one or more desirable configurations of the new product or new variation, based on input received from the secondary users. Advantageously, using the web application 150, the primary user may more conveniently have a product or service configured using input from other desired participants—regardless of whether the primary user desires to purchase the product or service or introduce the product or service into the market. Accordingly, the primary user may more conveniently determine configurations of a product or service to be provided/sold to other users. In this regard, the primary user may more conveniently perform marketing research for the product or service, using the web application 150.

Figure 3:
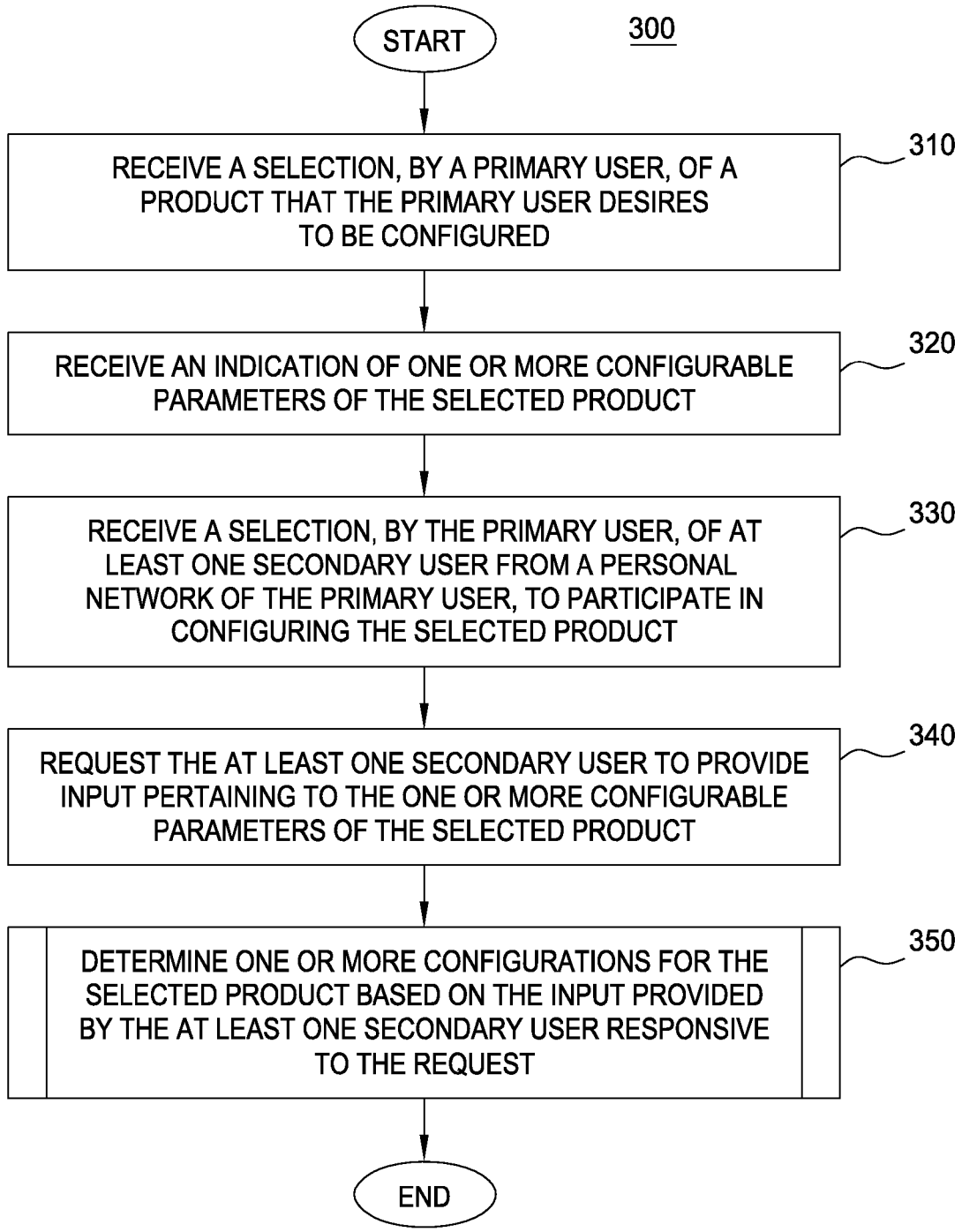
FIG. 3 is a flowchart depicting a method for configuring a product or service via social interactions, according to one embodiment of the invention.

FIG. 3 is a flowchart depicting a method 300 for configuring a product or service via social interactions, according to one embodiment of the invention. That the methods are described herein with reference to configuring a product is merely exemplary and is not intended to be limiting of the invention. Other embodiments, such as configuring a service via social interactions, are broadly contemplated. As shown, the method 300 begins at step 310, where the web application 150 receives a selection, by a primary user, of a product that the primary user desires to be configured. At step 320, the web application 150 receives an indication of one or more configurable parameters of the selected product. At step 330, the web application 150 receives a selection, by the primary user, of at least one secondary user from a personal network of the primary user, to participate in configuring the selected product. At step 340, the web application 150 requests the at least one secondary user to provide input pertaining to the one or more configurable parameters of the selected product. At step 350, the web application 150 determines one or more configurations for the selected product based on the input provided by the at least one secondary user responsive to the request. The method 350 is further described below in conjunction with FIG. 4. After the step 350, the method 300 terminates.

Figure 4:
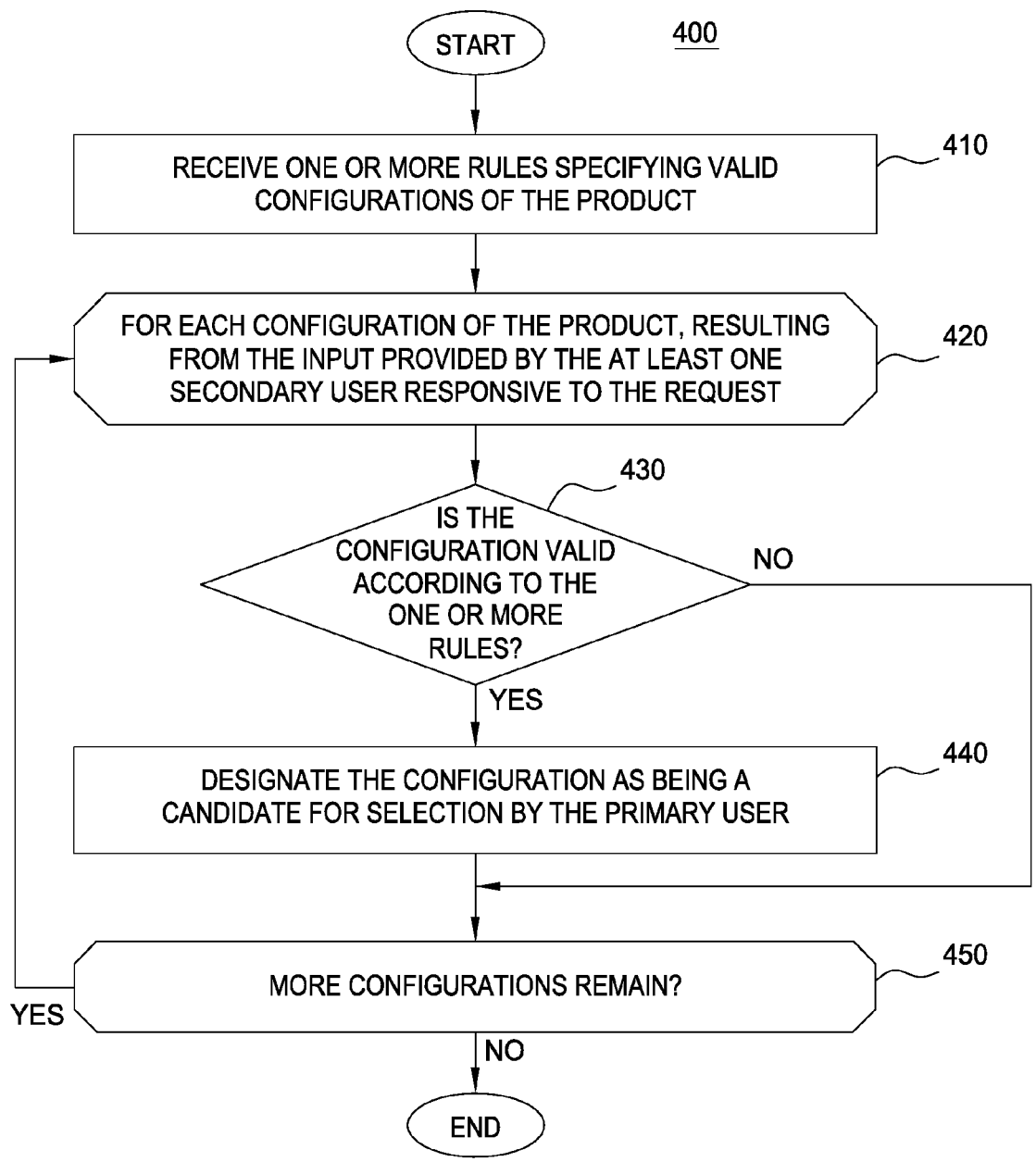
FIG. 4 is a flowchart depicting a method for determining one or more configurations for a product or service, according to one embodiment of the invention.

FIG. 4 is a flowchart depicting a method 400 for determining one or more configurations for a product or service, according to one embodiment of the invention. The method 400 corresponds to the step 350 of FIG. 3. As shown, the method 400 begins at step 410, where the web application 150 receives one or more rules specifying valid configurations of the product. At step 420, the web application 150 enters a loop to process each configuration of the product that results from the input provided by the at least one secondary user responsive to the request. At step 430, the web application 150 determines whether the respective configuration is valid according to the one or more rules. If so, the web application 150 designates the respective configuration as being a candidate for selection by the primary user (step 440). At step 450, the web application 150 determines whether more configurations of the product remain. If so, the method 400 returns to the step 420 to process a next configuration of the product. Otherwise, the method 400 terminates.

Advantageously, embodiments of the invention provide techniques for configuring a product or service based on social interactions. One embodiment of the invention provides a web application for configuring a product or service. The web application may receive, from a primary user, an indication of a desired product or service to be configured. The web application may also receive an indication of configurable parameters of the desired product or service. The web application may also receive a selection of one or more secondary users to participate in configuring the desired product or service. The web application may determine one or more configurations for the desired product or service, based on input received from the one or more secondary users. Advantageously, at least in some cases, the primary user may more conveniently have a desired product or service configured using input from other desired participants.

While the foregoing is directed to embodiments of the present invention, other and further embodiments of the invention may be devised without departing from the basic scope thereof, and the scope thereof is determined by the claims that follow.

What is claimed is:

1. A computer-implemented method of multi-user item configuration based on validation rules, the method comprising:
   receiving a selection, by a primary user, of an item that the primary user desires to be configured prior to at least one of: (i) the primary user specifying to purchase the configured item and (ii) the primary user specifying the configured item as being available for at least one other user to purchase, wherein the item is selected from a product and a service;
   receiving an indication of one or more configurable parameters of the selected item;
   receiving one or more validation rules specifying valid configurations of the selected item;
   receiving a selection, by the primary user, of a plurality of secondary users from a personal network of the primary user, to participate in configuring the selected item, wherein the personal network is, at least in part, provided by at least one of a social networking application, a blogging application, and a personal information manager, wherein each secondary user in the plurality of secondary users has a respective, distinct role of a plurality of roles, the plurality of rules including a first role defined by the primary user and a second role defined by an administrative user different from the primary user;
   requesting at least one secondary user of the plurality of secondary users to provide input pertaining to the one or more configurable parameters of the selected item; and
   programmatically determining one or more configurations for the selected item, by operation of one or more computer processors and based on the received one or more validation rules and the input provided by the at least one secondary user responsive to the request.

2. The computer-implemented method of claim 1, further comprising:
   receiving input from the primary user specifying, for each secondary user, one or more configurable parameters that the secondary user is allowed to set;
   wherein the one or more configurations for the item are further determined based on the input received from the primary user.

3. The computer-implemented method of claim 2, further comprising:
   presenting the one or more configurations to at least one of the primary user and the at least one secondary user.

4. The computer-implemented method of claim 3, further comprising:
   generating a preview of the item, based on the one or more configurations; and
   outputting the preview for display to at least one of the primary user and the at least one secondary user.

5. The computer-implemented method of claim 4, further comprising:
   subsequent to determining the one or more configurations for the selected item, designating a configuration of the one or more configurations, to be used in configuring the item, based on input from the primary user.

6. A computer program product for multi-user item configuration based on validation rules, the computer program product comprising:
- a computer-readable storage medium having computer-readable program code embodied therewith, the computer-readable program code comprising:
  - computer-readable program code configured to receive a selection, by a primary user, of an item that the primary user desires to be configured prior to at least one of: (i) the primary user specifying to purchase the configured item and (ii) the primary user specifying the configured item as being available for at least one other user to purchase, wherein the item is selected from a product and a service;
  - computer-readable program code configured to receive an indication of one or more configurable parameters of the selected item;
  - computer-readable program code configured to receive one or more validation rules specifying valid configurations of the selected item;
  - computer-readable program code configured to receive a selection, by the primary user, of a plurality of secondary users from a personal network of the primary user, to participate in configuring the selected item, wherein the personal network is, at least in part, provided by at least one of a social networking application, a blogging application, and a personal information manager, wherein each secondary user in the plurality of secondary users has a respective, distinct role of a plurality of roles, the plurality of rules including a first role defined by the primary user and a second role defined by an administrative user different from the primary user;
  - computer-readable program code configured to request at least one secondary user of the plurality of secondary users to provide input pertaining to the one or more configurable parameters of the selected item; and
  - computer-readable program code configured to programmatically determine one or more configurations for the selected item, based on the received one or more validation rules and the input provided by the at least one secondary user responsive to the request.

7. The computer program product of claim 6, wherein the computer-readable program code further comprises:
- computer-readable program code configured to receive input from the primary user specifying, for each secondary user, one or more configurable parameters that the secondary user is allowed to set;
- wherein the one or more configurations for the item are further determined based on the input received from the primary user.

8. The computer program product of claim 7, wherein the computer-readable program code further comprises:
- computer-readable program code configured to present the one or more configurations to at least one of the primary user and the at least one secondary user.

9. The computer program product of claim 8, wherein the computer-readable program code further comprises:
- computer-readable program code configured to generate a preview of the item, based on the one or more configurations; and
- computer-readable program code configured to output the preview for display to at least one of the primary user and the at least one secondary user.

10. The computer program product of claim 9, wherein the computer-readable program code further comprises:
- computer-readable program code configured to designate, subsequent to determining the one or more configurations for the selected item, a configuration of the one or more configurations, to be used in configuring the item, based on input from the primary user.

11. A system of multi-user configuration based on validation rules, the system comprising:
- one or more computer processors; and
- a memory containing a program, which when executed by the one or more computer processors is configured to perform an operation comprising:
  - receiving a selection, by a primary user, of an item that the primary user desires to be configured prior to at least one of: (i) the primary user specifying to purchase the configured item and (ii) the primary user specifying the configured item as being available for at least one other user to purchase, wherein the item is selected from a product and a service;
  - receiving an indication of one or more configurable parameters of the selected item;
  - receiving one or more validation rules specifying valid configurations of the selected item;
  - receiving a selection, by the primary user, of a plurality of secondary users from a personal network of the primary user, to participate in configuring the selected item, wherein the personal network is, at least in part, provided by at least one of a social networking application, a blogging application, and a personal information manager, wherein each secondary user in the plurality of secondary users has a respective, distinct role of a plurality of roles, the plurality of rules including a first role defined by the primary user and a second role defined by an administrative user different from the primary user;
  - requesting at least one secondary user of the plurality of secondary users to provide input pertaining to the one or more configurable parameters of the selected item; and
  - programmatically determining one or more configurations for the selected item, based on the received one or more validation rules and the input provided by the at least one secondary user responsive to the request.

12. The system of claim 11, wherein the operation further comprises:
- receiving input from the primary user specifying, for each secondary user, one or more configurable parameters that the secondary user is allowed to set;
- wherein the one or more configurations for the item are further determined based on the input received from the primary user.

13. The system of claim 12, wherein the operation further comprises:
- presenting the one or more configurations to at least one of the primary user and the at least one secondary user.

14. The system of claim 13, wherein the operation further comprises:
- generating a preview of the item, based on the one or more configurations; and
- outputting the preview for display to at least one of the primary user and the at least one secondary user.

15. The system of claim 14, wherein the one or more configurable parameters that each secondary user is allowed to set comprises a distinct set of parameters, wherein the operation further comprises:
- subsequent to determining the one or more configurations for the selected item, designating a configuration of the one or more configurations, to be used in configuring the item, based on input from the primary user;

wherein the one or more configurations for the selected item are programmatically determined by an application and without requiring any user input explicitly specifying the one or more configurations, wherein the application is configured to independently present the one or more configurations to each individual user selected from the primary user and the at least one secondary user, wherein the application is configured to independently output the preview for display to each individual user selected from the primary user and the at least one secondary user.

16. The system of claim 15, wherein each distinct role has an distinct associated weight of a plurality of weights specified by the primary user via the application and characterizing a level of deference accorded by the primary user to the role, wherein the one or more configurations for the selected item is determined based further on the plurality of weights, wherein at least one configuration for the selected item is reserved by the primary user and for the primary user to exclusively configure, wherein determining the one or more configurations for the selected item comprises:

evaluating a plurality of potential combinations of parameter values of the one or more configurations and that conform to the provided input, against the one or more validation rules; and programmatically selecting, based on the evaluation, a potential combination of parameter values of the one or more configurations that satisfies the most of the one or more validation rules, relative to the remaining one or more potential combinations of parameter values of the one or more configurations.

17. The system of claim 16, wherein the application is independently configured to determine the one or more configurations for the selected item in order to facilitate each individual event selected from: (i) the primary user purchasing the configured item and (ii) the configured item being made available for sale from the primary user and to at least one user other than the primary user and the plurality of secondary users;

wherein the application comprises a web application that includes:
(i) a participant module configured to allow the primary user to manage which secondary users are allowed to participate in configuring the selected item;
(ii) a generator module configured to determine the one or more configurations for the selected item; and
(iii) a connector module configured to provide connectivity to the social networking application.

18. The system of claim 17, wherein the participant module includes:

(i) an activity filter configured to: (A) receive the indication of the one or more configurable parameters of the selected item and (B) specify, based on input from the primary user, which activities, input controls, and parameter values are accepting for configuring each parameter of the selected item;
(ii) an activity mapper configured to independently associate, with the social networking application, parameters of the selected item and each individual activity selected from specifying a parameter value via the web application, by posting a comment including the parameter value, on a website other than the web application, and by sending an email that includes the parameter value;
(iii) a plurality of application adapters, of which each adapter is specific to an application programming interface (API) of a respective social networking application; and
(iv) an input validator configured to evaluating the plurality of potential combinations of parameter values of the one or more configurations, against the one or more validation rules.

19. The system of claim 18, wherein the generator module includes:

(i) a configuration builder configured to generate a tree data structure representing the plurality of potential combinations of parameter values of the one or more configurations and that conform to the provided input;
(ii) a configuration handler configured to: (A) independently traverse the generated tree data structure using each individual predefined technique selected from depth-first search and breadth-first search and (B) provide one or more configurations in the generated data structure to a parameter manager; and
(iii) a configuration viewer configured to: (A) generate a preview of the selected item, based on the one or more configurations and (B) independently output the preview for display to each individual user selected from the primary user and the plurality of secondary users;

wherein the parameter manager configured to:
(i) provide one or more configuration parameters to the social networking application;
(ii) designate the determined configuration to be applied to the selected item;
(iii) store information indicating which configurations more frequently result from configurations by secondary users; and
(iv) provide the stored information to the participant module to independently indicate, to each user selected from at least one of the primary user and the plurality of secondary users, which parameter values are frequently selected by other users.

* * * * *